3,291,443
SHUT-OFF DEVICE FOR PIPELINES
Joachim Schulz, Martin-Rieffert-Str. 33, Dusseldorf, Germany, and Werner Fehr, Klosterstr. 45, Krefeld, Germany
Filed Nov. 21, 1962, Ser. No. 239,242
Claims priority, application Germany, Nov. 22, 1961,
Sch 30,598
3 Claims. (Cl. 251—305)

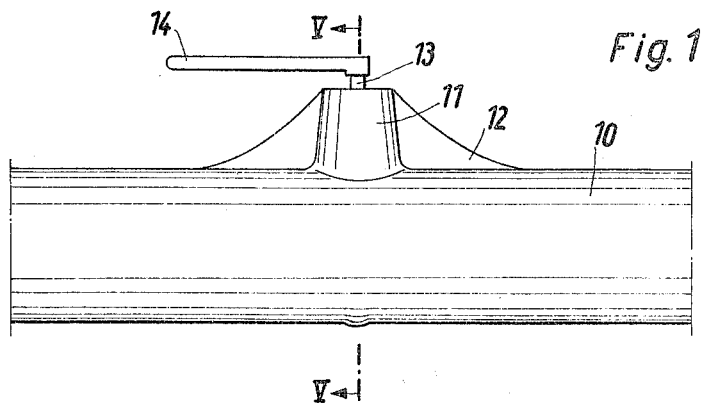
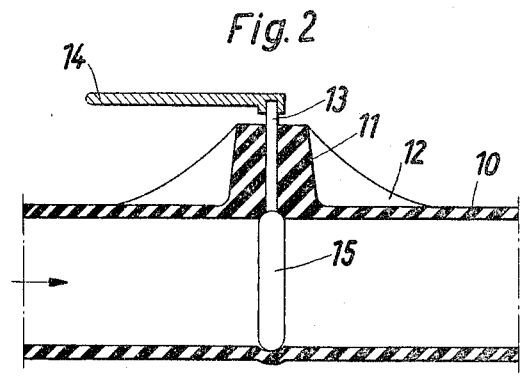
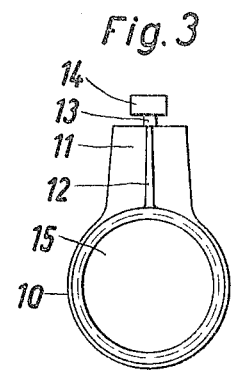
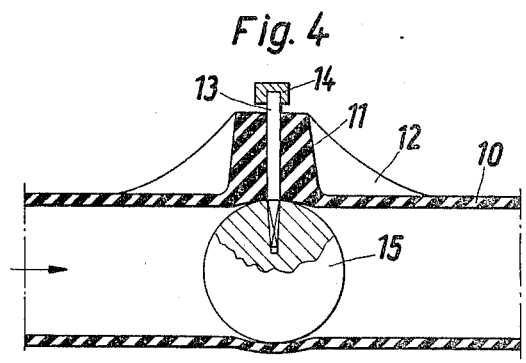
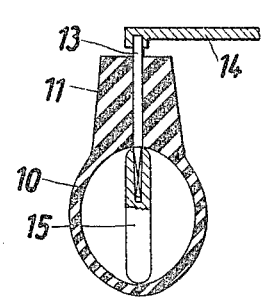

In shut-off valves, slide-valves and throttle valves, the milled joint surfaces are attacked by the medium flowing through, particularly in hot water piping, and then a sufficiently fluidtight seal is no longer obtained. With throttle valves, for example, at the start of a hot water heating system, the rise in pressure during the frequent change between complete opening and complete closing of the valve has also been found undesirable as it leads to shock impact from the water which endangers the joints. When renewing leaky shut-off valves the joint surfaces both of the valve housing and also of the shut-off member itself have to be renewed. The fitting of the throttle valve in the pipe has to be effected with a special joint, for example, a stuffing box.

By contrast the invention results in a simplification of the method constructing a shut-off device in that there is inserted in an elastic pipe a previously stressed shut-off disc whose diameter is made somewhat larger than the bore of the elastic pipe and which is provided with a spindle passing through the pipe wall. The elastic pipe is preferably provided with a connecting element which acts as a bearing and a sealing joint for the spindle. The connecting element may be provided with formed-on stiffening ribs.

The shut-off disc is guided in the pipe cross-section and is provided with a slightly convex rim which simultaneously acts as a sealing surface. The spindle carries an actuating lever, a control wheel or the like. The connecting member is made so as to form simultaneously a sealing joint for the spindle.

An embodiment of the invention will be described by way of example with reference to the accompanying drawing, in which:

FIGURE 1 shows a shut-off device in side elevation,

FIGURE 2 shows a vertical section with the shut-off disc closed,

FIGURE 3 shows the closed shut-off disc in the longitudinal direction of the pipe, FIGURE 4 shows a vertical section in the opened position and FIGURE 5 shows a section along the line V—V in FIGURE 1 but in the opened condition.

A pipe 10 consisting of rubber, an elastomer, synthetic plastic material or the like is provided with a formed-on connecting element 11, which can be reinforced by ribs 12 extending the longitudinal direction of the pipe. In the pipe 10 is inserted a shut-off disc 15 whose diameter is somewhat greater than that of the bore of the pipe 10. The disc 15 is then held under pre-stress in the pipe 10.

The shut-off disc 15 is made of brass, bronze or some other suitable advantageously corrosion-resistant material and has a slightly convex rim. The thickness of the shut-off disc 15 is such that when inserted it does not cut into the walls of the elastic pipe.

Through the bore of the connecting element 11 is inserted a spindle 13 for which the connecting element 11, because of its elastic properties, simultaneously acts as a seal. The free end of the spindle 13 projecting out of the connecting element carries an operating lever 14, a control wheel or the like.

In the construction in accordance with the invention the dimensions of the shut-off disc 15 with the convex rim and the wall thickness of the elastic pipe or hose are so adjusted in relation to one another that the convex rim of the disc 15 ensures an adequate seal in the closed position.

The wall of the pipe 10 acts simultaneously as a guide because of the prestressing with which the disc 15 is inserted, making it possible to keep the disc 15 in any position. The elastic pipe wall also simultaneously serves as a valve housing and seal, thus also saving the necessity of having a gland. The selflocking action of the elastic wall of the pipe 10 is maintained even in the completely open position of the shut-off disc 15.

The cross-section of the shut-off disc 15 is adapted to the free bore diameter of the pipe 10. The shut-off device can also be used for pipes whose cross-section is not circular.

The connecting element 11 can be formed on to the pipe 10 or fitted subsequently. A shut-off device formed in accordance with the invention may be inserted subsequently in any hose or elastic pipeline or incorporated as a pre-formed fitting. The smooth inner wall of the pipe used as a valve seating remains free from damage. Any deposits from the flowing medium against the convex rim of the disc 15 are always removed again by contact with the elastic inner wall when closing the shut-off disc 15. In the case of undesirable overpressures the elastic pipe wall deflects, with the shut-off disc 15 closed, in the zone of its convex rim. The shut-off device then acts simultaneously as a safety-valve. When the normal pressure is reached again then the complete rim joint is again effective. Apart from hot water piping and the like, the shut-off device in accordance with the invention can also be used in other pipelines and hoses insofar as these have elastic walls.

What we claim is:

1. A pipe of elastomeric material having a boss integral therewith, a cylindrical opening through the boss communicating the inside of the pipe with the outside, a thin metallic valve element of larger cross-section than the pipe mounted therein, and a spindle of greater cross-section than said opening secured to the valve element and extending from the periphery of the valve element through the opening, said spindle forming the only projection from the periphery of the valve element.

2. A device as in claim 1 further including reinforcing ribs integral with the boss and pipe extending in the longitudinal direction of the pipe.

3. A device as in claim 2 further including an operating member secured to the spindle.

References Cited by the Examiner
UNITED STATES PATENTS

| | | | |
|---|---|---|---|
| 825,345 | 7/1906 | Perotti | 251—368 X |
| 2,022,395 | 11/1935 | White et al. | 251—306 |
| 2,299,865 | 10/1942 | Whitted | 251—306 X |
| 2,867,238 | 1/1959 | Wilfert | 251—368 X |

FOREIGN PATENTS

| | | |
|---|---|---|
| 859,984 | 12/1952 | Germany. |
| 590,720 | 4/1959 | Italy. |

M. CARY NELSON, *Primary Examiner.*

ISADOR WEIL, *Examiner.*

D. ROWE, A. ROSENTHAL, *Assistant Examiners.*